Figure 1:
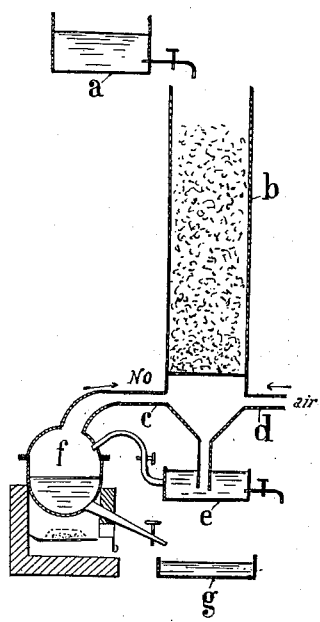

Nov. 25, 1924.

M. C. J. E. DE LOISY 1,516,915

PROCESS FOR EXTRACTING SULPHUR FROM GASES CONTAINING SULPHURETED HYDROGEN

Filed May 31, 1922

INVENTOR
MARIE CHARLES J.E. DE LOISY
BY
*Lorka, Kehlenbeck & Mathé*
ATTORNEYS

Patented Nov. 25, 1924.

1,516,915

UNITED STATES PATENT OFFICE.

MARIE CHARLES JOSEPH ELISÉE DE LOISY, OF PARIS, FRANCE, ASSIGNOR TO AUGUSTIN AMÉDÉE LOUIS JOSEPH DAMIENS, OF ARCUEIL-CACHAN, FRANCE, TO HIMSELF, AND TO OLIVIER JOSEPH GISLAIN PIETTE, OF BRUSSELS, BELGIUM.

PROCESS FOR EXTRACTING SULPHUR FROM GASES CONTAINING SULPHURETED HYDROGEN.

Application filed May 31, 1922. Serial No. 564,884.

*To all whom it may concern:*

Be it known that I, MARIE CHARLES JOSEPH ELISÉE DE LOISY, of 64 Rue la Boetie, Paris, France, have invented a Process for Extracting Sulphur from Gases Containing Sulphureted Hydrogen, of which the following is a clear and exact description.

It has been known for a long time that, if through an acidulated solution of a ferric salt (sulphate, perchloride, etc.,) we pass a stream of sulphureted hydrogen, the latter is decomposed and sulphur is precipitated, according to the equation:

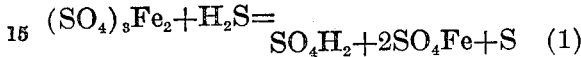
$$(SO_4)_3Fe_2 + H_2S = SO_4H_2 + 2SO_4Fe + S \quad (1)$$

Sulphur can thus be extracted from gases containing it in the form of very diluted hydrosulphuric acid, such as coke oven gas, lighting gas, gas from gas producers, etc. A simple filtration or the action of centrifugal force will effect the separation of the precipitated sulphur.

But the reagent becomes progressively inactive when being converted into a ferrous salt, in acid solution, which does not react on $H_2S$.

It is necessary to regenerate it by causing it to be reconverted into a ferric salt, according to the reaction:

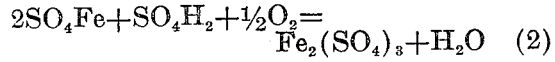
$$2SO_4Fe + SO_4H_2 + \tfrac{1}{2}O_2 = Fe_2(SO_4)_3 + H_2O \quad (2)$$

Now, neither oxygen nor air act rapidly in these conditions and the reoxidation by a stream of air is practically nil.

According to the present invention, this reoxidation is obtained by means of a stream of air, oxidizing agent of no cost, owing to a catalyzer which fixes oxygen without consuming itself, so that finally the sulphur is precipitated by a reagent which is indefinitely regenerated without other expenses than the insignificant losses due to the manipulations.

The catalyzer recommended is nitric acid or nitrous acid, which is added at the beginning, either in the form of acid or in the form of a salt to the ferrous sulphate in acid solution which is to be reoxidized.

Since the experiments made by Schlesing it is well known that the reaction of nitric acid on ferrous salts is the following, this reaction being effected in the hot state (80–100° C.) :

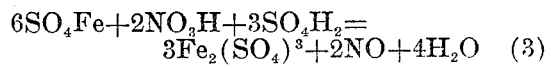
$$6SO_4Fe + 2NO_3H + 3SO_4H_2 = 3Fe_2(SO_4)_3 + 2NO + 4H_2O \quad (3)$$

and for nitrous acid:

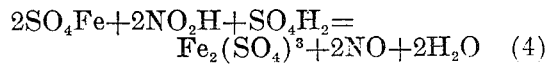
$$2SO_4Fe + 2NO_2H + SO_4H_2 = Fe_2(SO_4)_3 + 2NO + 2H_2O \quad (4)$$

These reactions are integral; all the nitrogen evolves in the state of gaseous NO and the liquid does not retain any trace thereof.

Now, it is possible, by means of the NO gas evolved, to regenerate the nitric acid and nitrous acid used.

In fact NO put in presence of air gives well known rutilant fumes:

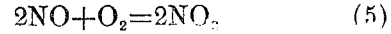
$$2NO + O_2 = 2NO_2 \quad (5)$$

which themselves, in contact with water, are converted into a mixture of nitric and nitrous acids:

$$2NO_2 + H_2O = NO_3H + NO_2H \quad (6)$$

It will be seen that the whole of the reactions 3, 4, 5 and 6 constitutes a cycle from which is not given out the initial nitrogen introduced and in which a solution of ferrous salt is finally converted into ferric salt by the action of oxygen.

The new process is carried out in the following manner:

First of all, the precipitation of the sulphur is effected in any bubbling-through apparatus (contact column, plate column, etc.) in which is preferably provided a methodical circulation; the liquid laden with sulphur is prevented from taking part in the circulation,—the sulphur is separated by filtration or by centrifugal action and the liquid is sent to the regenerating plant.

For this operation, the ferrous liquid to be regenerated first serves to absorb the mixture $2NO+O_2$ evolved in a previous treatment. For that purpose the ferrous liquid is caused to trickle in an absorption tower, at the bottom of which enters the mixture of air and oxide of nitrogen. In proportion as it passes down, the liquid becomes laden with nitric and nitrous acids constituting the oxidizing reagent. This liquid, collected at the bottom, is then suitably heated so that it is thereby converted into a ferric salt and gives up, in the form of NO, the nitric reagent it has absorbed and which serves for the treatment of a new quantity of ferrous liquid.

Fig. 1 of the accompanying diagrammatic drawing, given by way of example only, shows how this process can be carried out.

$a$ designates a vat adapted to receive the ferrous liquid constituting the residue of previous operations. This liquid flows from this vat into an absorption column $b$ filled with coke or materials on which the liquid trickles and is put in contact on large surfaces with the NO gas and air admitted at the base of the column through pipes $c$ and $d$.

The liquid, which flows to the base of the column and which has become laden with the nitric acid formed, is collected in a vat $e$, from which it is sent into a kettle $f$. NO evolves and passes into the column $b$ through the pipe $c$, as above stated.

The regenerated ferric salt passes into a vat $g$, from which it can be subsequently drawn off.

Figure 2:
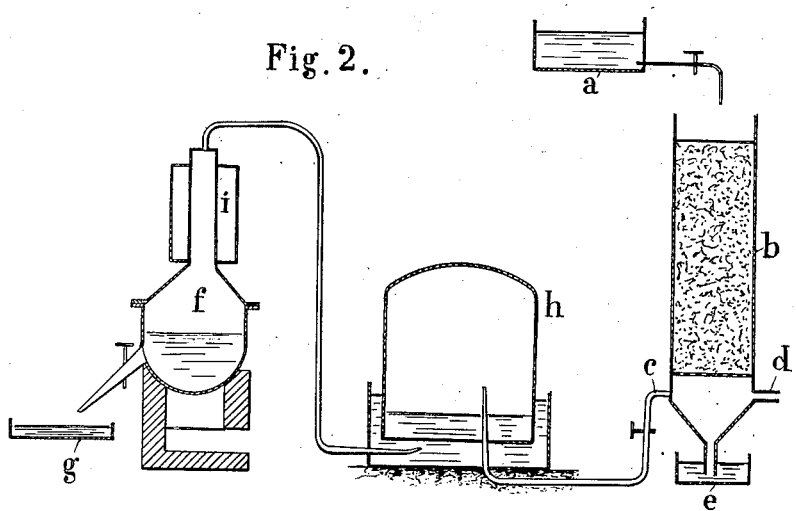

The arrangement of the apparatus shown in Fig. 2 is exactly similar to that of Fig. 1, with the exception that a gasometer $h$ is interposed between the kettle $f$ and the base $c$ of the column.

At the upper part of the kettle is arranged a cooling device $i$ adapted to condense the water formed and to prevent its going into the gasometer.

Figure 3:
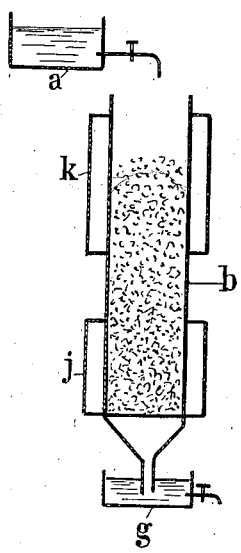

Fig. 3 shows another method of carrying out the process in which the heating of the ferric liquor, for the purpose of causing NO to evolve, is effected in the column $b$ itself at the base of the latter.

In this case, the column $b$ is provided with a heating jacket $j$ and a cooling jacket $k$. The ferrous liquid is put in the vat $a$ and the ferric liquid is collected in the vat $g$. The nitrogen effects its closed cycle within the column $b$.

In all cases, it will be understood that with an absorption column sufficiently high, by suitably controlling, on the one hand, the stream of air and nitrous oxide and, on the other hand, the afflux of the acid ferrous solution, it is possible to completely reoxidize the latter, without allowing the escape of the catalyzer which moves to and fro from the top to the bottom of the absorption apparatus, and which does not issue either with the ferric liquid from which it has been expelled by the heat.

Instead of using a single column-apparatus heated at the bottom and cooled at the top, it is obvious that the reactions may be divided into partial reactions or steps carried out individually in several successive apparatuses.

If the sulphureted hydrogen should exist in the gas in a highly diluted condition, a reagent more active than ferric sulphate (for instance zinc sulphate or acetate) might be used.

The zinc sulphide formed, separated from the liquor, would then be treated for evolving therefrom $H_2S$ which would be recuperated in a ferric salt.

The zinc salt would return to the precipitating plant and as for the ferrous salt freed from sulphur, it would be treated for reoxidizing it as above stated.

The above arrangements are given by way of example only. All the details concerning the execution and carrying out of the new process may be varied according to circumstances without departing thereby from the principle of the invention.

Claims:—

1. A process for extracting the sulphur contained in hydrosulphuric gas or in volatile sulphides, even when there are only traces of this gas in other gases, which substantially consists in precipitating it in the midst of an acid liquor of a ferric salt and in regenerating the ferrous liquor resulting therefrom by oxidizing the latter by air by means of a catalyzer constituted by an oxygen acid of nitrogen, so that, with the exception of insignificant losses, the separation of the sulphur involves the consumption of no chemical agent other than oxygen in the form of air.

2. A process for extracting the sulphur contained in hydrosulphuric gas or in volatile sulphides, in which a ferrous liquid is put in contact in an absorption column with a mixture of air and nitric oxide (NO) arising from a previous operation, the ferric liquid obtained being then heated for recuperating the nitric oxide and allowing it to return to the absorption column.

3. A process for extracting the sulphur contained in hydrosulphuric gas or in volatile sulphides, which substantially consists in causing such gas or sulphides to react with an acid solution of a ferric salt, thereby precipitating said sulphur in the midst of such liquor, and in regenerating the resulting ferrous liquor by oxidizing it with air by means of a catalyzer constituted by an oxygen acid of nitrogen, the ferrous liquid passing through a column comprising a cooled portion and a heated portion, the nitric oxide evolved in said heated portion being absorbed by the liquid in said cooled portion and the resulting ferric liquid being directly collected at the base.

4. A process for extracting the sulphur contained in hydrosulphuric gas or in volatile sulphides, even when there are only traces of this gas in other gases, which consists substantially in precipitating the sulphur in the midst of an acid liquor of a ferric salt and in regenerating such ferric salt from the resulting ferrous liquor by oxidizing the latter by air in the presence of a catalyzer formed by a mixture of nitric and nitrous acids, so that, with the exception of insignificant losses, the separation of the sulphur involves the consumption of no chemical agent other than oxygen in the form of air.

The foregoing specification of my process and apparatuses for extracting sulphur from gases containing sulphureted hydrogen, signed by me this 19th day of May, 1922.

MARIE CHARLES JOSEPH ELISÉE de LOISY.